United States Patent [19]

Focke et al.

[11] Patent Number: 5,593,107
[45] Date of Patent: Jan. 14, 1997

[54] APPARATUS FOR HANDLING REELS OF WEBS OF MATERIAL

[75] Inventors: Heinz Focke; Harald Gosebruch, both of Verden; Thomas Häfker, Etelsen, all of Germany

[73] Assignee: Focke & Co. (GmbH & Co.), Verden, Germany

[21] Appl. No.: 543,687

[22] Filed: Oct. 16, 1995

Related U.S. Application Data

[63] Continuation of Ser. No. 83,773, Jun. 30, 1993, abandoned.

[30] Foreign Application Priority Data

Jun. 30, 1992 [DE] Germany ............... 42 21 052.6

[51] Int. Cl.$^6$ .............. B65H 19/00; B65H 67/00
[52] U.S. Cl. ............ 242/559.4; 242/533; 414/911
[58] Field of Search .............. 242/559, 559.3, 242/559.4, 533, 35.5 A; 414/910, 911, 908, 735; 901/28, 29; 254/93 R

[56] References Cited

U.S. PATENT DOCUMENTS

| 2,678,025 | 5/1954 | Straky ................. 118/500 |
| 3,203,531 | 8/1965 | Pretot, Jr. ............ 198/40 |
| 3,291,415 | 12/1966 | Bursk ................ 242/559 X |
| 3,718,302 | 2/1973 | Mount et al. ......... 242/81 |
| 3,806,058 | 4/1974 | Munchbach ........... 242/559.4 X |
| 3,824,674 | 7/1974 | Inoyama et al. ....... 29/407 |
| 4,358,143 | 11/1982 | Cullen ............... 414/911 X |
| 4,407,625 | 10/1983 | Shum ................. 414/735 X |
| 4,441,662 | 4/1984 | Seragnoli ............ 242/559 X |
| 4,723,884 | 2/1988 | Brinker et al. ....... 414/908 X |
| 4,732,525 | 3/1988 | Neumann .............. 901/28 X |

FOREIGN PATENT DOCUMENTS

| 188787 | 4/1987 | European Pat. Off. . |
| 347311 | 12/1989 | European Pat. Off. . |
| 393780 | 10/1990 | European Pat. Off. . |
| 2548948 | 1/1985 | France . |
| 1253546 | 11/1967 | Germany . |
| 1506513 | 7/1969 | Germany . |
| 1532203 | 1/1970 | Germany . |
| 99344 | 5/1971 | Germany . |
| 2335407 | 1/1975 | Germany . |
| 3026995 | 2/1982 | Germany . |
| 3208006 | 11/1982 | Germany . |
| 3425734 | 1/1985 | Germany . |
| 3408171 | 10/1985 | Germany . |
| 3501692 | 7/1986 | Germany . |
| 3627586 | 3/1987 | Germany . |
| 3631205 | 3/1988 | Germany . |
| 3632237 | 4/1988 | Germany . |
| 3721091 | 1/1989 | Germany . |
| 4024284 | 2/1992 | Germany . |
| 2-291340 | 12/1990 | Japan . |
| 651022 | 3/1951 | United Kingdom . |
| 1444569 | 8/1976 | United Kingdom . |

OTHER PUBLICATIONS

Allgemeine Papier–Rundschau, "Das Handling Von Kleinrolen (II)", Apr. 27, 1979, pp. 1059–1063.

*Primary Examiner*—John Q. Nguyen
*Attorney, Agent, or Firm*—Sughrue, Mion, Zinn, Macpeak & Seas

[57] ABSTRACT

An apparatus for handling reels of webs of material includes a reel conveyor (35), having a downwardly directed supporting journal (41) which can be accurately positioned, serves which for handling reels (10) formed from a wound web of material, especially from packaging material. The supporting journal enters a central orifice (11) of the reel (10) and engages the reel. The supporting journal (41) is accurately alignable with the respective position of the reel (10) or a working journal (33) of a packaging machine or the like by separately operable pressure medium cylinders (47, 48, 49). The working journal (33) at the packaging machine is driven rotatably and, at the same time, tiltably between an upright position and two opposed horizontal positions.

19 Claims, 10 Drawing Sheets

APPARATUS FOR HANDLING REELS OF WEBS OF MATERIAL

This is a Continuation of application Ser. No. 08/083,773 filed Jun. 30, 1993 abandoned.

BACKGROUND OF THE INVENTION

The invention relates to an apparatus for handling reels formed from (wound) webs of material, especially from packaging material, in conjunction with processing machines (packaging machines), in which the reels can be taken up, transported and deposited at the processing machine by reel conveyors, which are movable above the processing machines, with the aid of a reel holder engaging one reel at a time.

The invention is based on the object of proposing measures for a simple, fully automatic and high capacity handling of wound packaging material (reels) in conjunction with packaging machines.

SUMMARY OF THE INVENTION

In order to attain this object, the apparatus according to the invention is characterized in that each reel holder is connected to the reel conveyor by adjusting means, especially by pressure medium cylinders, which are variable in length, whereby the adjusting means or pressure medium cylinders can be operated separately and independently of one another.

A reel supporting means is disposed on the reel holder, preferably a supporting journal which enters a conventional central orifice of the reel and thus engages the reel. Alternatively, it would also be possible to use supporting means which engage the reel at its outer periphery.

In a preferred exemplary embodiment of the invention, there are three pressure medium cylinders which are spaced at approximately equal angular distances, and which carry the reel holder and are individually adjustable in order to set the required position.

A further subject of the invention is the arrangement of a reel supporting means, in particular a working journal acting as a receiving means for reels at the processing machine, especially the packaging machine. According to the invention, the working journal which enters the central orifice of the reel is mounted pivotably between an upright position for receiving the reel and a horizontal working position. In this working position, the web of material is drawn from the reel. According to the invention, there is, additionally, a third (horizontal) position, in which a core or a tube of an empty reel can be pushed off the working journal.

The tube of the empty reel is taken up automatically by a tube holder which holds the tube ready for discharge, preferably by the reel conveyor for transporting the reels.

The reel supporting means, i.e. the supporting journals, are equipped with optoelectric sensing means which control an automatic accurate positioning of one supporting journal relative to another supporting journal, or of supporting journals relative to the central orifice of reels. In particular, these sensing means take the form of a camera which is disposed at the free end of a supporting journal and which responds to counter means. When reels are taken up, for example from a pallet, the camera ensures an accurate introduction of the supporting journal into the central orifice of the reel. The reel may be provided with markings which can be identified by the camera in order to determine the type of reel or packaging material. In an advantageous example, the cores or tubes of the reel can be color coded in order to distinguish different packaging materials.

Further details of the invention are described, in detail, hereinafter with reference to an exemplary embodiment illustrated in the drawings:

DESCRIPTION OF THE PREFERRED EMBODIMENTS

The illustrated exemplary embodiment is directed to the handling of reels 10 of wound web-like material, primarily packaging material, but also other materials such as cigarette paper and coating paper for cigarette filters. The reels 10 which are wound webs are usually provided with a central orifice 11 in which there is a tube onto which the web of material is wound.

Figure 1:
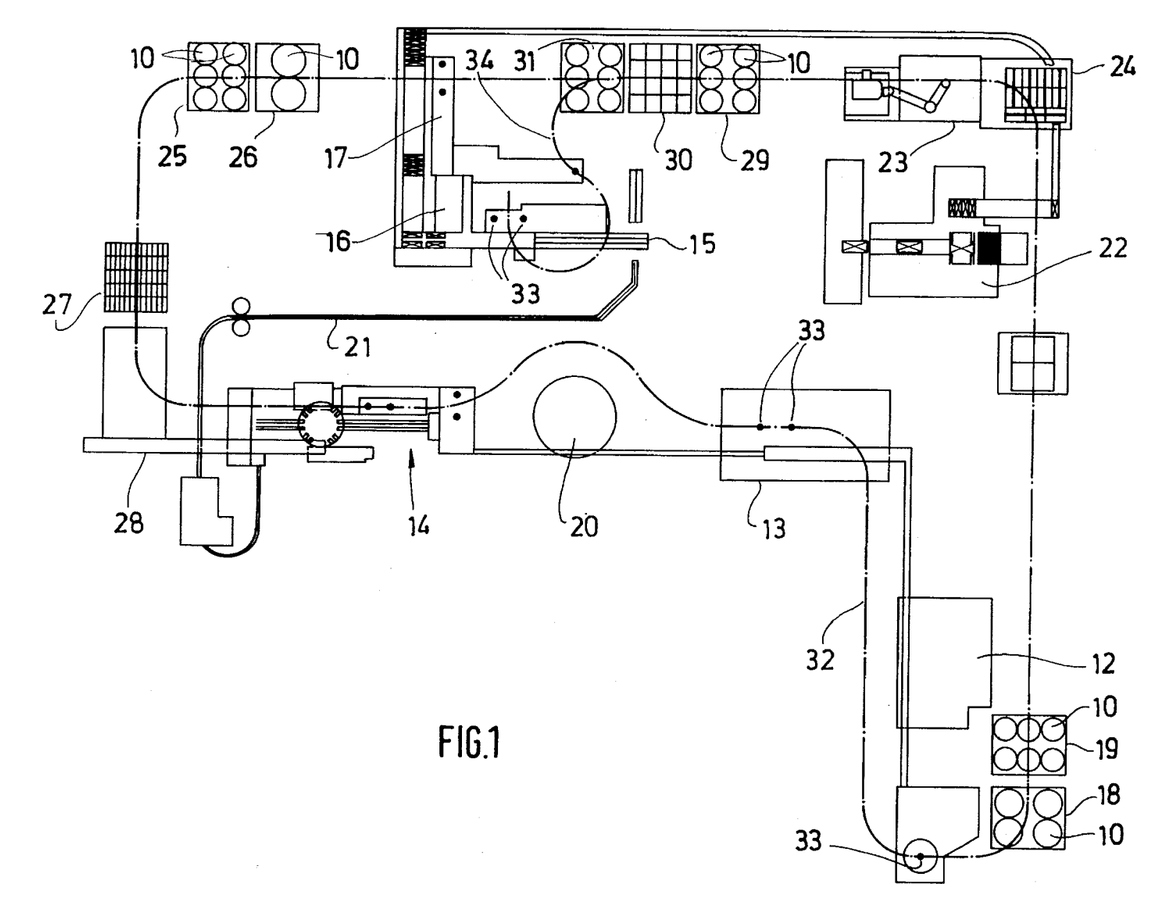
FIG. 1 is a schematic plan view of a plant including several processing machines for packaging material and a conveying system for the material.

FIG. 1 shows a sketchily illustrated plan view of a complete plant for the production and packaging of cigarettes. This plant comprises a cigarette production machine 12, a filter-attaching machine 13, a packaging machine 14, a film wrapping machine 15, a cigarette carton packer 16 and a cigarette carton wrapping machine 17.

The cigarettes are produced in the region of the cigarette production machine 12. This machine is associated with a cigarette paper store 18. Additionally, a coating paper store 19 is located in this region. The coating paper is used in the region of the filter-attaching machine 13. The cigarettes which are completed in this machine reach a cigarette store 20.

From the cigarette store 20, the cigarettes are fed to the (cigarette) packaging machine 14, in which the cigarette packages are produced and are fed with a pack conveyor 21 to further packaging machines. These include the film wrapping machine 15 which applies the outer film wrapper of the cigarette pack. The following carton packer 16 serves for the production of pack bundles (cigarette cartons). Finally, there follows a carton wrapping machine 17 which applies an outer wrapper of the cigarette cartons.

The large cigarette package which is thus ready for sale is fed to a cartoning machine 22 in which the bundle packs are filled into carton boxes. This machine is followed by a palletizer 23 which loads the boxes onto pallets 24.

In the production of cigarette packs of the hinge-lid type, different kinds of packaging material are used in the packaging machine 14. A tin-foil store 25 and a collar store 26 are disposed in a place which is relatively far away from the packaging machine 14, but which is nevertheless favorable in terms of utilization of available space. The tin-foil store 25 contains web-like packaging material (tin-foil) used as an inner wrapper for the pack contents. The material for the production of a collar (thin card-board) is in this case held ready in the form of a reel 10 in the collar store 26. A blank store 27 contains blanks for the hinge-lid packs which have been prepared for production in a different way, in particular by punching. The blanks or blank stacks are fed to the packaging machine 14 on a separate blank conveyor 28.

The packaging material for the plastic film outer wrapper of the individual packs is held ready in the region of a film store 29. This packaging material is also provided in the form of reels 10. Prefabricated blanks of thin card-board which are located in the region of a cigarette carton store 30 are used for the bundle wrapper. Finally, there is a further store, in particular an outer film store 31 for the outer wrapping material of the cigarette cartons. This packaging material is also provided in the form of a reel 10.

In the illustrated exemplary embodiment, a closed transport system transports the reels 10 from the above mentioned reel stores to the processing machines. This transport system is an "overhead conveyor" comprising a conveyor track, that is to say a conveyor rail 32 located above the stores and machines. The conveyor rail 32 is, in this case, a closed track and disposed such that it extends over all stores containing packaging material. Consequently, it is possible to pick up packaging material from each store. Additionally, each of the processing machines is serviced by the rail in such a way that at least one working journal 33 and, in the case of some individual machines, two working journals can be supplied. The receiving stations for the packaging material of the carton packer 16 and the film wrapping machine 15 are reached via a curved or S-shaped branch line 34 of the conveyor rail 32. The branch line 34 first of all extends over a device for receiving cigarette carton blanks from the carton store 30. Thereafter, the branch line 34 leads to the two working journals 33 of the film wrapping machine 15 in order to supply reels from the film store 29.

Figure 2:
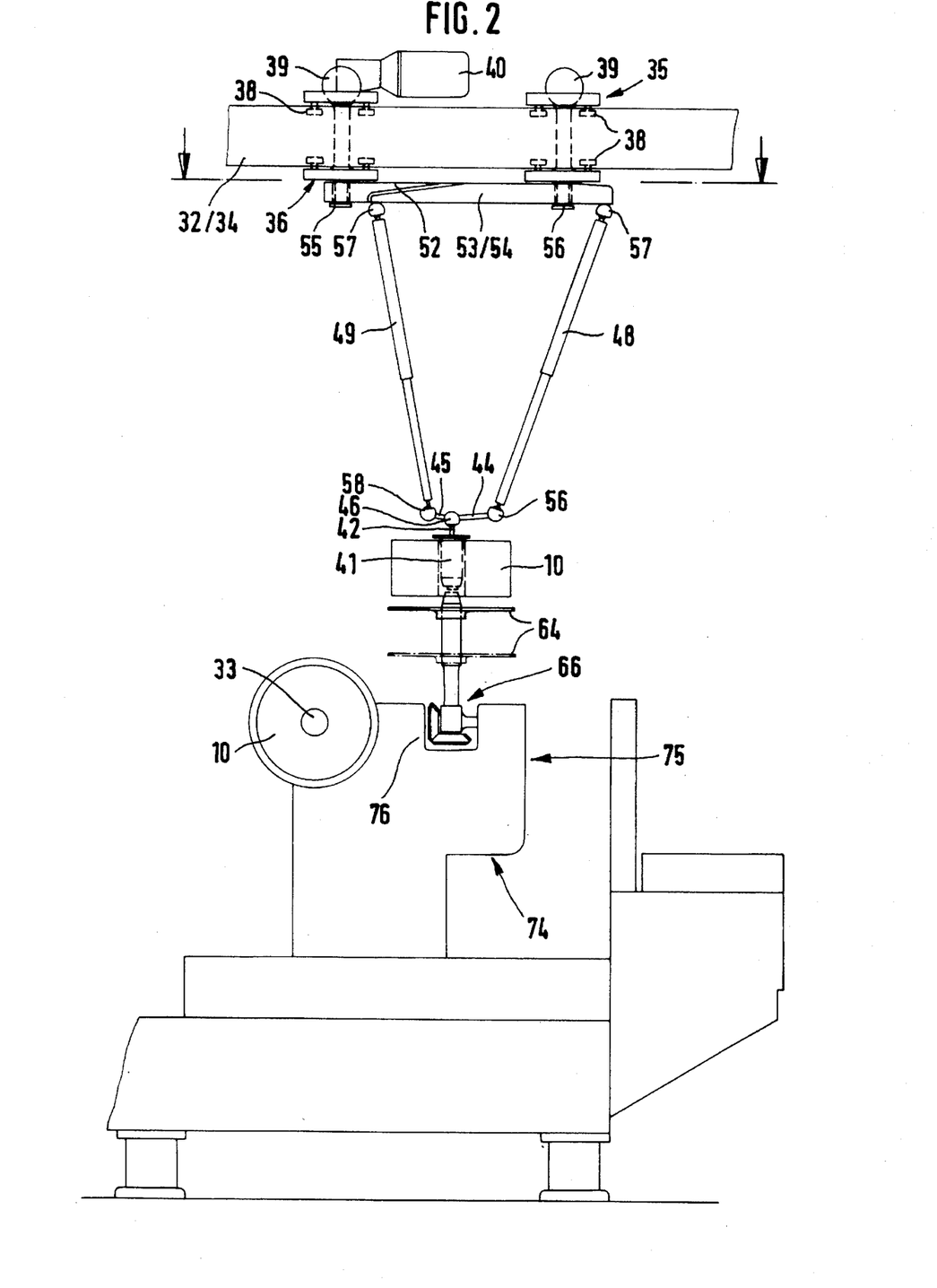
FIG. 2 is a side view of a reel conveyor in the region of a packaging machine.

The individual reels 10 are transported by a reel conveyor 35 which is formed from an undercarriage 36, movable along the conveyor rail 32 and the branch line 34, and from a reel holder 37. The reel holder serves for engaging and holding one reel 10 at a time. The reel conveyor 35 is movable a long the conveyor rail 32 with the aid of rollers 38, 39 which are rotatable about horizontal or vertical axes. A motor 40 which is assigned to each reel conveyor 35 serves as a drive.

At the underside of the undercarriage 36, the reel holder 37 is disposed to be vertically adjustable and tiltable. A supporting journal 41 serves as a supporting means for receiving the reel 10 and is introduced into the central orifice of the reel 10. The reel holder 37 can be moved up and down together with the supporting journal 41 and is adjustable in a transverse-axial direction (with respect to the supporting journal 41). In this embodiment, the supporting journal 41 always remains in a vertical position.

The supporting journal 41 forms part of the reel holder 37 and is connected to a supporting frame via a connecting piece 42 (short rod). This supporting frame is, in this case, formed from three supporting arms 43, 44, 45 which are directed relative to one another in a star-shaped manner at equal angular distances. The supporting arms are rigidly connected to one another in a central junction point. The connecting piece 42 adjoins this junction point at the bottom, in particular via a ball-and-socket joint 46 whose upper fixed part is connected to the junction point of the supporting arms 43, 44, 45. As a result of the ball-and-socket joint 46, the supporting journal 41 is always held in the vertical position automatically, namely under gravity, and is moved up and down with the reel holder and shifted transverse-axially.

The supporting arms 43..45 are held by supporting elements which are variable in length. These supporting elements are pressure medium cylinders 47, 48, 49 which take the form of elongated double-acting pneumatic telescopic cylinders. As a result, the pressure medium cylinders 47..49 can transfer a long range of lift to the supporting journal 41.

Figures 5, 6:
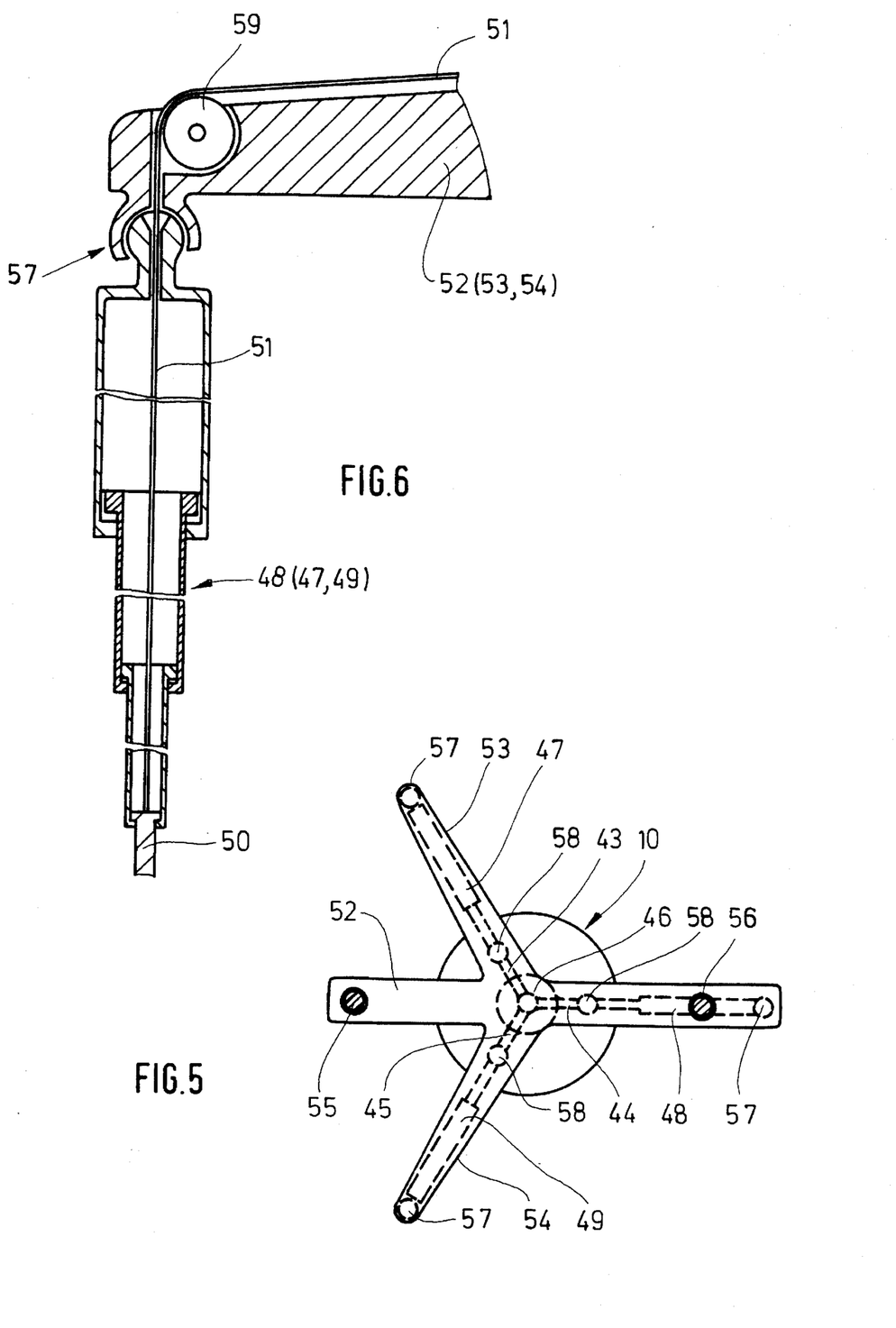
FIG. 5 is a horizontal section taken on line V—V of FIG. 2, showing a detail of the reel conveyor.
FIG. 6 is a vertical section of a detail of the reel conveyor, on an enlarged scale.

The pressure medium cylinders 47..49 which are also directed in a star-shaped manner, in particular in the plane of the supporting arms 43..45, are connected to the undercarriage 36 of the reel conveyor 35 with their upper ends. For this purpose, the undercarriage 36 comprises a crosspiece 52 which extends in the longitudinal direction, that is to say in the travelling direction, and laterally directed cantilever arms 53 and 54 which are directed at an angle relative to the crossbeam 52. As a result, a likewise star-shaped supporting structure is formed in the planes of the cantilver arms 43..45. The crossbeam 52 is connected to a frame of the rollers 38, 39 with end portions via supporting bolts 55, 56.

Each pressure medium cylinder 47, 48, 49 can be actuated, i.e. extended or retracted, indivdiually. As a result, there are different relative positions of the reel holder 37 and, thus, the supporting journal, which positions are adapted to the respective circumstances. To permit these positions, the pressure medium cylinders 47..49 are connected with their upper ends via ball-and-socket joints 57 to the undercarriage 36 and via further ball-and-socket joints 58 to the supporting arms. The upper ball-and-socket joints 57 are located, on the one hand, at one end of the crosspiece 52 and, on the other hand, at the ends of the cantilever arms 53, 54.

To receive a reel 10 from one of the stores 18, 19; 25, 26; 29, 31, a reel conveyor 35 is moved above the respective store. In the region of the store, the reels 10 are stored with their central orifice 11 directed upwards. In an essentially upright position, the supporting journal 41 can enter into the central orifice 11 from above. To compensate for any inaccuracies with regard to the positioning of the reels, the outer diameter of the supporting journal 41 is significantly smaller than the diameter of the central orifice 11, that is to say of a tube 77 of the reel 10. This considerable play compensates any inaccuracies of the relative positions during introduction of the supporting journal 41.

The supporting journal 41 is designed (in a known manner) in such a way that clamping means 78 act within the central orifice 11 and ensure that the reel 10 is sufficiently secured on the supporting journal 41, even if the journal is in an upright position. The clamping means 78 are movable in the radial direction and can be operated, for example, hydraulically, pneumatically or mechanically.

With the supporting journal 41 being located in the central orifice 11, the reel 10 can be lifted off the store, in particular by means of an appropriate retraction of the pressure medium cylinders 47..49. In the region of one of the processing machines described above, the reel holder 37 is lowered down. In the exemplary embodiment described above, the reel 10 is transferred directly to a working journal 33 of the packaging machine or the like. In this process, the working journal 33 may be located in an upright position, but it would also be possible to transfer the reel to a horizontally directed working journal 33 if the supporting journal 41 is in a corresponding position.

The means (pressure medium cylinders 47..49) for adjusting the supporting journal 41 permit a fully automatic transfer and further handling of the reels 10. As a result of sensing means, especially optoelectric sensors or cameras, the supporting journal 41 is automatically aligned with the central orifice 11 by means of defined adjustments of the pressure medium cylinders 47..49 and is then introduced into the central orifice.

The transfer control system, which is not shown in detail, requires that the relative position of the individual pressure medium cylinders 47..49 has to be continuously determined in an accurate fashion and has to be taken into account for the control of the movements. In particular, the length of extension of the pressure medium cylinders 47..49 has to be determined. This can be done in an ultrasonic fashion by measuring means located within the pressure medium cylinder 47..49. In this case, a lower extendable and retractable piston rod 50 of the pressure medium cylinder 47..49 serves as a reflection surface. FIG. 6 illustrates an alternative solution, in which a lower extendable part of the pressure medium cylinder 47..49, in particular the piston rod 50, is connected to a co-movable measuring means, in the present case a (thin) string 51. This string exits the pressure medium cylinder 47..49 at the upper end and leads to a measuring device. The winding and unwinding of the string 51 during the extension and retraction of the pressure medium cylinder 47..49 is measured. As a result accurate data with regard to the position of extension of the respective pressure medium cylinder 47..49 are obtained. In this case, the string 51 is passed through the ball-and-socket joint 57. At the end of the crosspiece 52 or cantilever arm 53, 54, the string is guided over a deflecting roller 59 and then reaches a measuring device which is not shown. The string 51 —or another suitable traction means—can also be used as a means for retracting the pressure medium cylinder 47, 48, 49. In this case, the pressure medium cylinder is extended by the pressure medium and retracted by the traction means (string 51).

Figure 3:
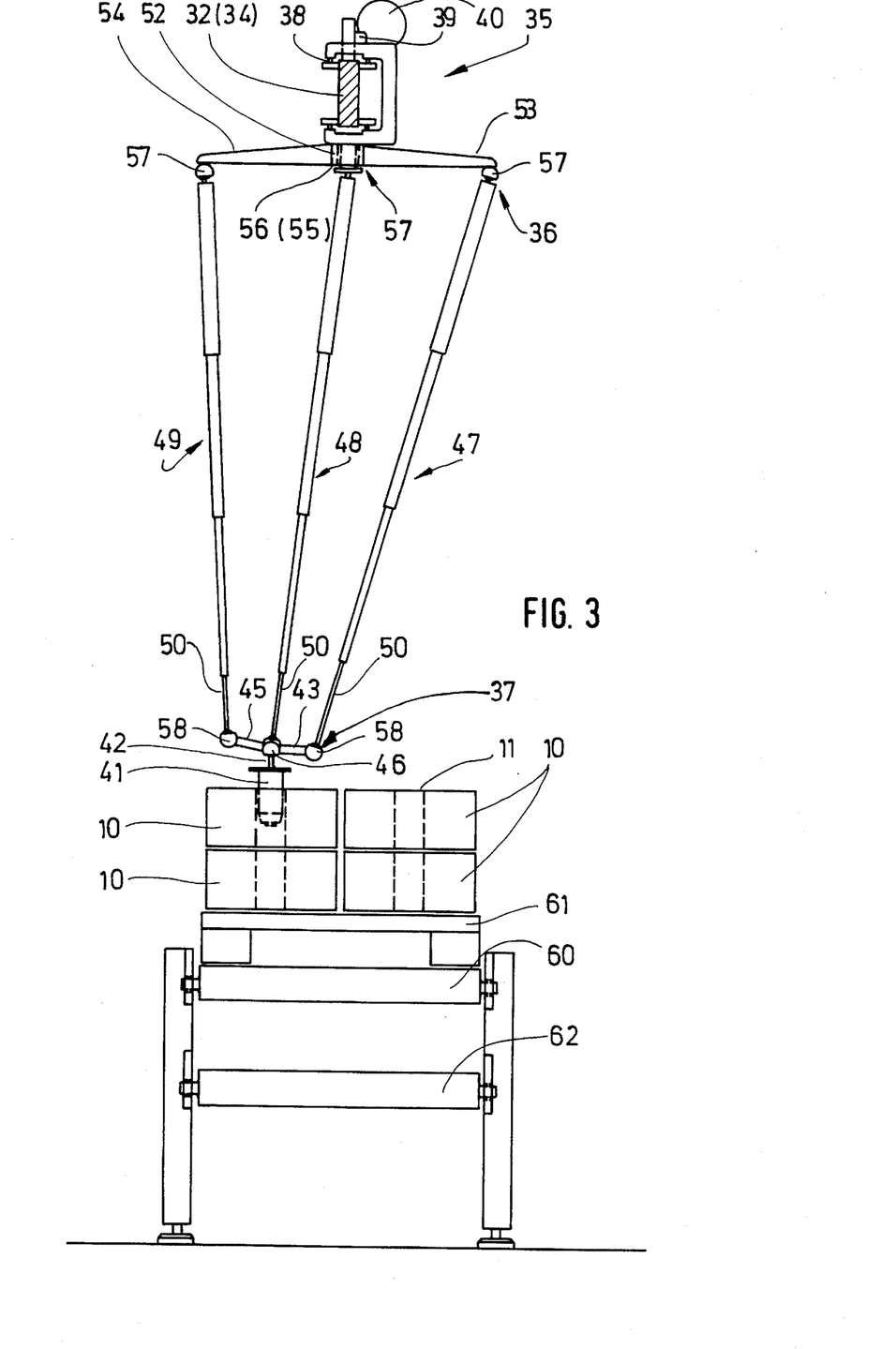
FIG. 3 is a sectional view, offset by 90° relative to FIG. 2, showing a detail of the reel conveyor in a region where a reel is taken up.
Figure 4:
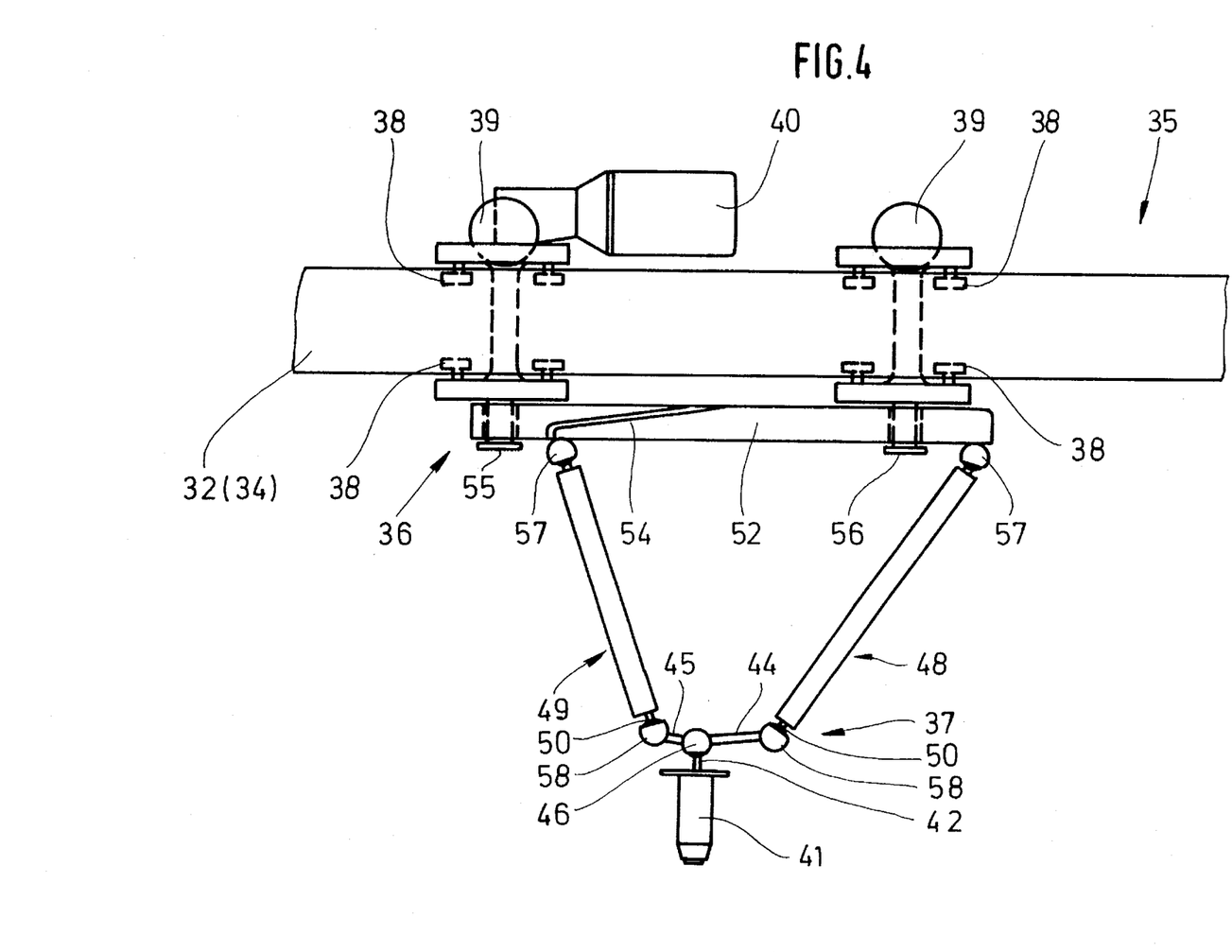
FIG. 4 is a detailed side view of a reel conveyor.

FIG. 3 illustrates one of the possible positions of the supporting journal 41, in which the supporting journal is offset relative to the mid-plane of the reel conveyor 35 because of a corresponding positioning of the reel 10. Nevertheless, the supporting journal 41 is introduced into the central orifice 11 in a vertical position. The vertical position is a result of the central ball-and-socket joint 46.

FIG. 3 also illustrates an example for the design of a store. This store is formed from an endless conveyor 60. Several (in this case two) rows of reels 10 which are stacked on top of one another are located on a pallet 61. From this pallet, the reels 10 are removed one after the other. As a result of the storing of the reels 10, they are disposed offest relative to the mid-plane defined by the endless conveyor 60 and the reel conveyor 35.

A return conveyor 62 for the empty pallets 61 is located underneath the endless conveyor 60.

Figure 7:
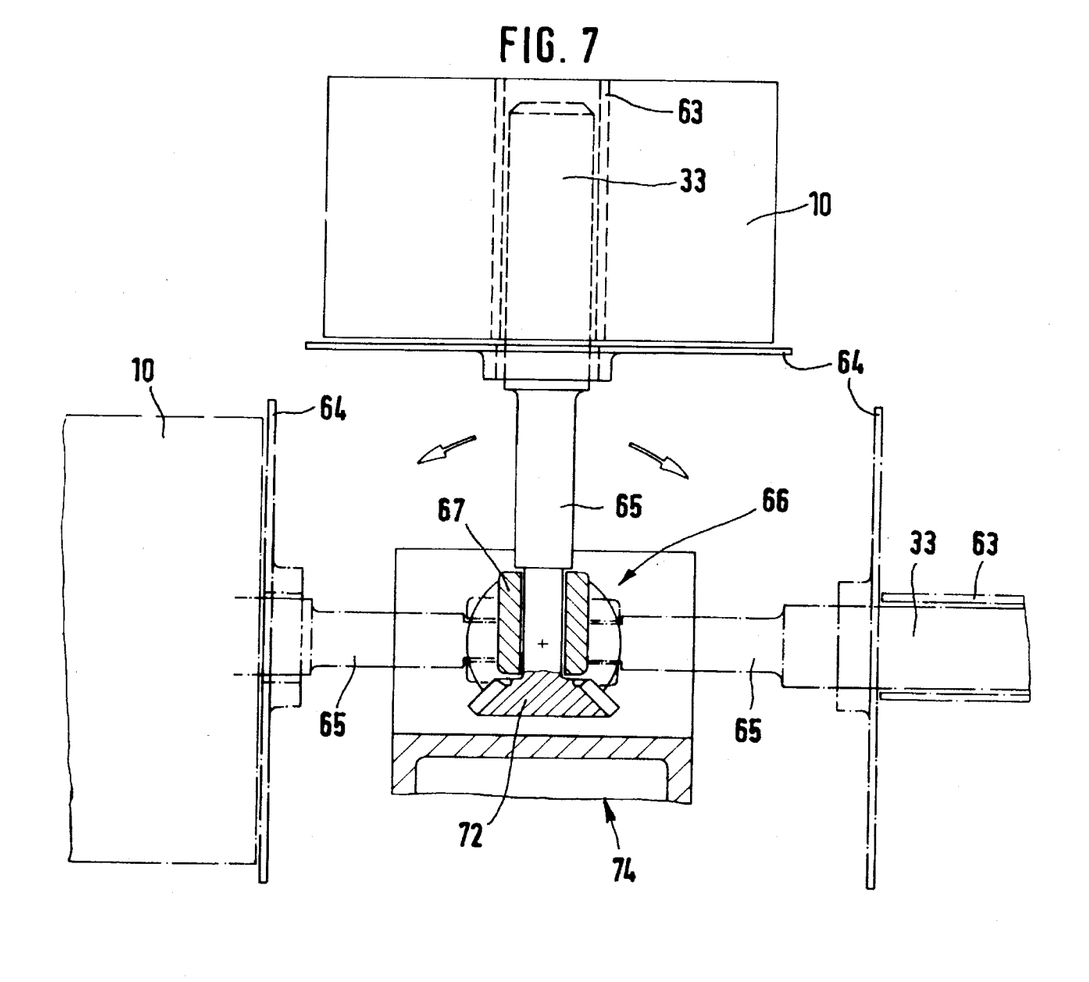
FIG. 7 is a side view or vertical section showing the mounting of a working journal of a packaging machine.
Figure 8:
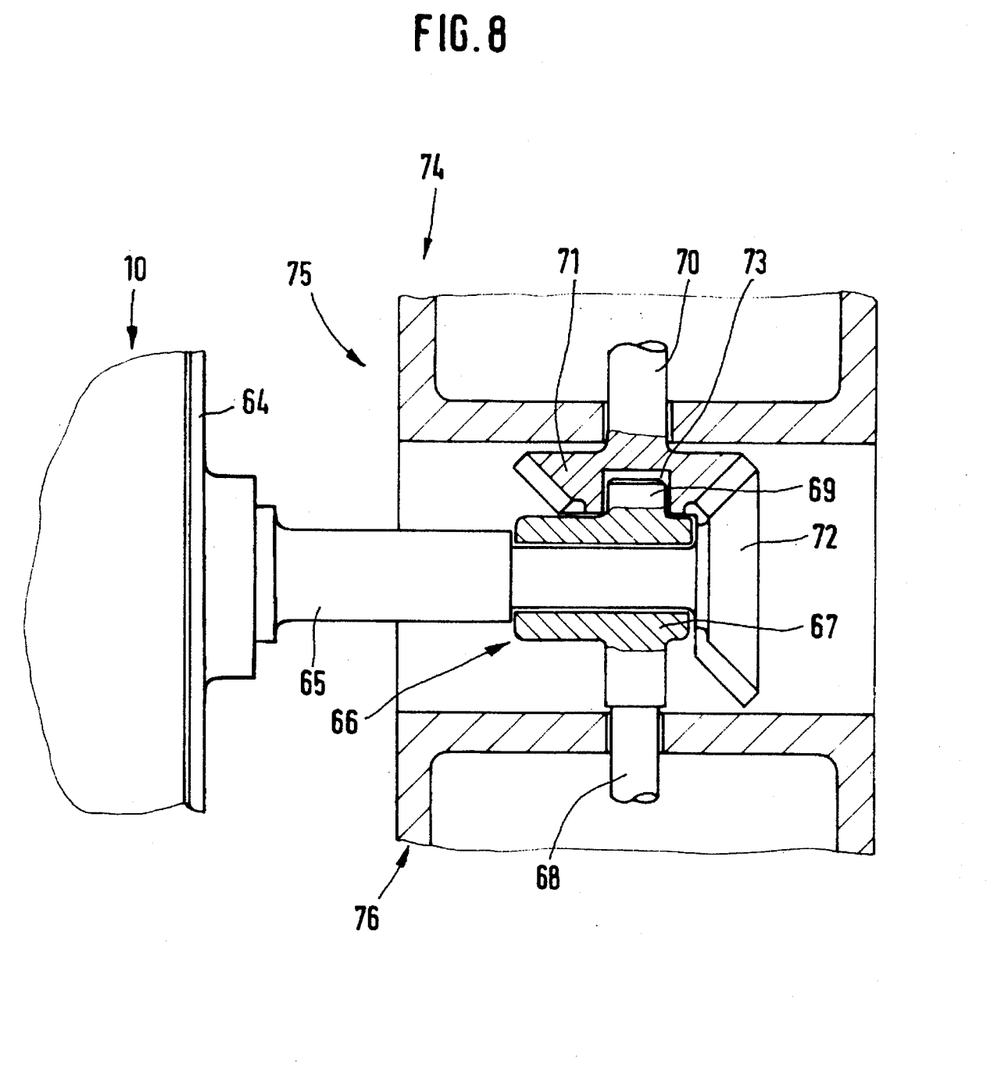
FIG. 8 is a horizontal section of the detail of FIG. 7 located in a different relative position.

A further separate outstanding feature is illustrated in an exemplary manner in FIGS. 7 and 8. The working journal 33 disposed at the processing machine, especially a packaging machine, is pivotably mounted. As is evident in particular from FIG. 7, the working journal 33 can be moved from an upright position into a horizontal position. The upright position primarily serves for receiving a new reel 10 which is delivered in the above described way. The horizontal position serves as a working position, in which the web of material is drawn from the reel 10 and the working journal 33 and is fed to the processing means.

The exemplary embodiment of FIG. 7 permits two oppositely directed horizontal positions. The left position of the working journal 33 as shown in FIG. 7 is the working position. On the opposite side, i.e. on the right hand side, a tube 63 of an empty reel 10 which defines the central orifice 11 can be stripped off the working journal 33. Thereafter, the working journal 33 is pivoted back into the upright position to receive a new reel 10. The working journal 33 is provided with a contact disc 64 (flange disc) on which the reel 10 rests in the working position. In this case, the contact disc 64 is shiftable in the axial direction. As a result, the tube 63 of the empty reel 10 can be pushed off the working journal 33 in the position described above. Additionally, the axial reciprocal shiftability of the contact disc 64 has another special purpose. When a reel 10 is placed on an (upright) working journal 33, the contact disc 64 moves up to the free (upper) end of the working journal 33 and thus serves as a support for the reel 10 during transfer to the working journal 33. Then, the contact disc 64 is moved back down in the axial direction and guides the reel to the correct position on the working journal 33. It is thus avoided that the reel 10 falls down into position.

Figure 10:
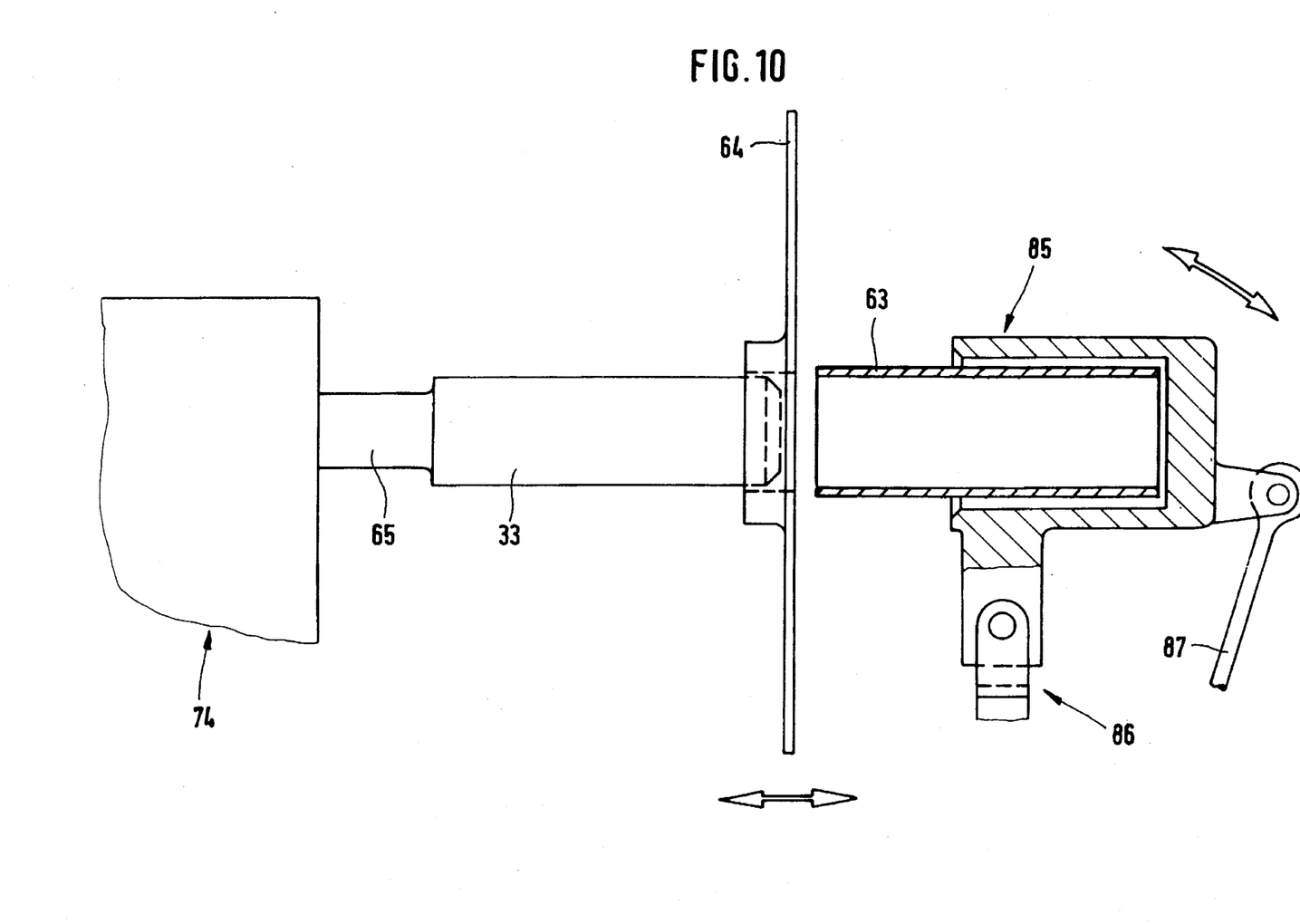
FIG. 10 is a side view of a tube holder for a tube of an empty reel in the receiving position.
Figure 11:
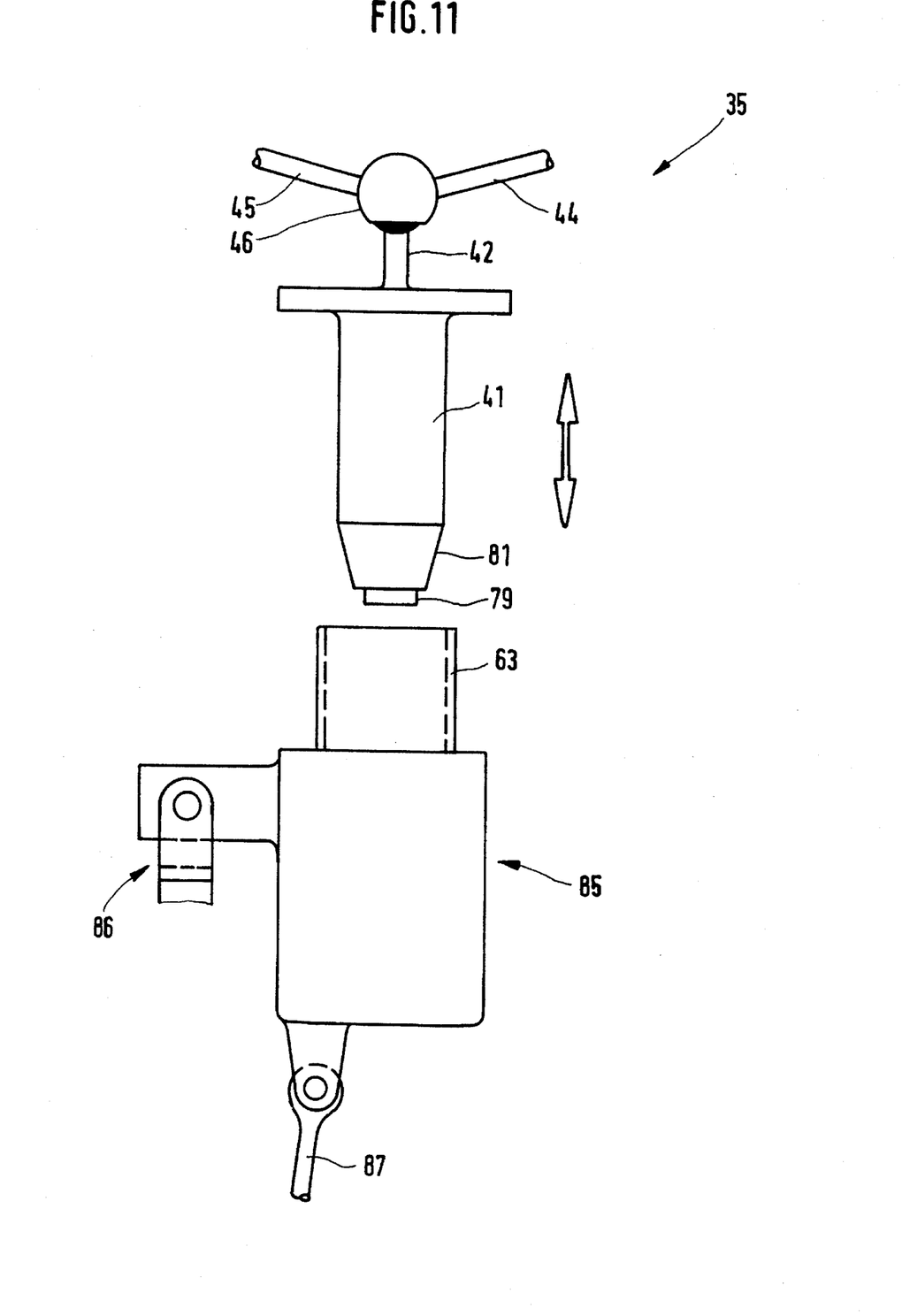
FIG. 11 is another side of the tube holder of FIG. 10 located in the transfer position.

When the tube 63 of the empty reel 10 is stripped off, it is pushed into a cup-like tube holder 85. The tube holder 85 is mounted pivotably in a pivot bearing 86 and can be pivoted by a pivot lever 87. In order to push off the tube 63 of an empty reel 10 the reel holder 85 is first of all pivoted into a horizontal position and the tube 63 of the empty reel 10 is then pushed off the working journal 33 and into the tube holder 85 by the contact disc 64. Then, the tube holder 85 is pivoted into an upright position. The tube 63 of an empty reel 10 is engaged by the supporting journal 41 of the reel conveyor 35 and is discharged.

On the rear side of the contact disc 64, the working journal 33 is provided with an axial extension, in particular a pivot pin 65. This pivot pin is located rotatably in a tilting bearing 66. The tilting bearing is formed from a bearing sleeve 67 in which the pivot pin 65 is mounted rotatably with an end portion. At the outer side, the bearing sleeve 67 has a rocking shaft 68 on the one side and, on the opposite side, a short bearing journal 69. The tilting or pivoting movement can be transmitted to the pivot pin 65 via the rocking shaft 68 which is connected to a drive which is not shown in detail. The bearing journal 69 forms a compensating support on the side which is located opposite the rocker shaft 68.

The tilting bearing 66 is designed such that, regardless of the position of the working journal 33, a rotary drive can be transmitted to the working journal. For this purpose, there is provided an angular gear. A drive shaft 70 which has a mitre wheel 71 on its end is disposed on the side located opposite the rocking shaft 68. The mitre wheel 71 is engaged to a mitre wheel 72 directed 90° relative thereto at the free end of the pivot pin 65. The rotary drive is thus transmitted from the drive shaft 70 through 90° to the pivot pin 65 and, thus, to the working journal 33.

The mitre wheel 71 is provided with a recess 73 which serves as a bearing for the short bearing journal 69.

The gear which is formed in this manner is installed in a special machine frame of the packaging machine or other machine. The machine frame 74 has a U-shape with upright supporting legs 75 and 76 which are formed from hollow sections. On the section walls which face one another, there are mounted, on the one hand, the rocking shaft 68 and, on the other hand, the drive shaft 70. The gear is installed between the supporting legs 75, 76, whereby lateral openings resulting from the U-section permit the opposed horizontal positions of the working journal 33 and the pivot pin 65 just like they permit the upwardly directed position.

Figure 9:
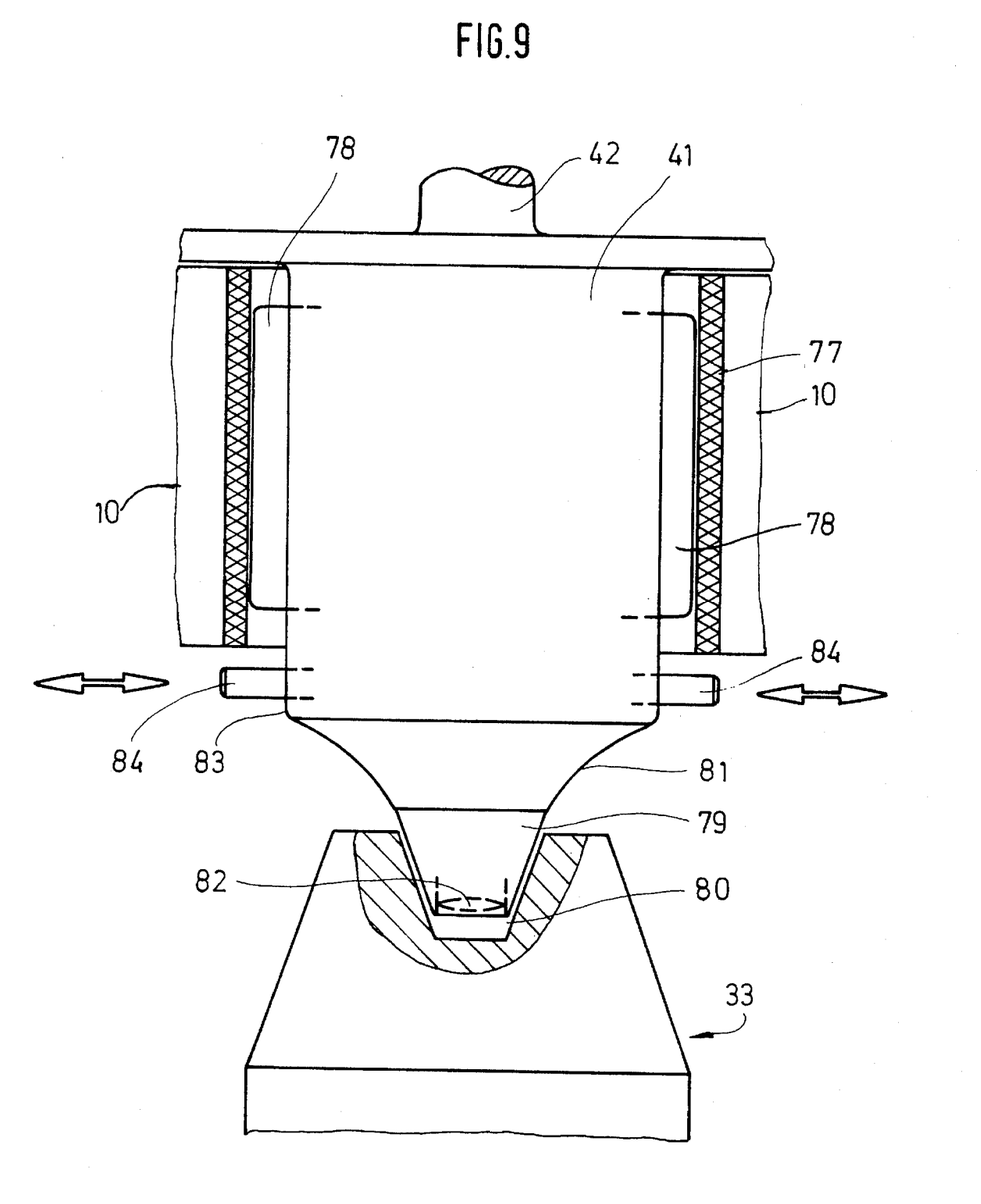
FIG. 9 is a partly sectional detailed view of a supporting journal and part of a working journal, on an enlarged scale.

Special measures are provided for the accurate transfer of the reel 10 from the transport journal 41 to the working journal 33 (FIG. 9). In the illustrated exemplary embodiment, these measures have been provided on the basis of an upright position of both the working journal 33 and the supporting journal 41. At the free or lower end, the supporting journal is designed such that it is possible to make a self-adjusting, that is to say self-centering and form-fitting positive connection to the working journal 33 in order to transfer the reel 10. In the illustrated exemplary embodiment, the free end of the transport journal 41 is provided with a centering cone 79 which takes the form of a truncated cone fitting into a correspondingly designed truncated depression 80 located at the free end of the working journal 33. The depression 80 is arranged to be central and extends in the axial direction. The centering cone 79 has considerably smaller dimensions than the supporting journal 41. A curved transition piece 81 is disposed between the centering cone 79 and the actual supporting part of the supporting journal 41.

An optoelectric sensing means 82 is disposed at the lower or free end of the supporting journal 41. In the present exemplary embodiment, the sensing means 82 is located in the region of the centering cone 79. The sensing means 82 automatically effects an accurate positioning of the supporting journal. A corresponding sensing means (transmitter and receiver) may be disposed in the region of the working journal 33.

If the sensing means 82 takes the form of a camera, the automatic detection of reels 10 in the region of a store, for example on a pallet, can be controlled with the aid of this camera. The sensing means 82 (camera) centers the supporting journal 41 in relation to the central orifice of a reel. The camera can also be used to identify the reels, if the reel has certain features indicative of a certain packaging material which are to be detected by the camera. For example, the tube 77 can be provided with a specifc color which is assigned to a certain packaging material. The sensing means 82 (camera) responds to colors and automatically selects the required reel 10 from the pallet or the like.

The supporting journal 41 is also provided with means for securing the reel 10 in the transport position. For this purpose, the axial dimension of the supporting journal 41 is longer than the axial dimension of the reel 10. An end piece 83 of the working journal 41 projects from the reel 10, that is to say the tube 77. In this region, securing means are disposed which, in the present exemplary embodiment, take the form of locking pins 84 which are movable in the radial direction. These locking pins can be retracted until they are located completely within the section of the supporting journal 41. In the extended position (FIG. 9) they protrude into the region of the reel 10 or tube 77, so that they are held by the locking pins 84 if the clamping means 78 fail. Several, for example three or four of such locking pins 84 may be distributed along the periphery of the supporting journal 41.

Expediently, the means which are disposed fully or partly within the (supporting) journal 41 are actuated by pressure media via appropriate cylinders or cylinder-like adjusting means. A suitable example is shown in DE-A-40 34 284 in FIGS. 6 and 7 which disclose solutions for the adjustability of the contact disc 64 and the clamping means 78.

We claim:

1. An apparatus for handling reels (10) formed from wound webs of packaging material used in conjunction with packaging machines, said apparatus comprising:

conveyor rails (32) mounted in a horizontal plane above the packaging machines and extending in a horizontal direction;

an overhead reel conveyor (35) comprising an undercarriage (36) movably mounted on said rails;

means (40, 38, 39) for moving said reel conveyor (35) on said conveyor rails (32) above the packaging machines;

arranged on a bottom side of the reel conveyor (35) and below said undercarriage (36), a reel holder (37) for grasping and holding one of the reels (10) at a time, said reel holder (37) being movable up and down, three pressure medium cylinders (47, 48, 49) which solely connect said reel holder (37) to said undercarriage (36) so that said reel holder (37) is exclusively supported by said three pressure medium cylinders, and which move said reel holder up and down, a horizontal supporting frame (52, 53, 54) on said undercarriage (36); three first ball-and-socket joints (57) connecting upper ends of said three pressure medium cylinders (47, 48, 49), respectively, to said horizontal supporting frame; and three second ball-and-socket joints (58) connecting lower ends of said three pressure medium cylinders (47, 48, 49) to said reel holder (37), said upper ends being spaced apart from one another at a greater distance than said lower ends, so that the pressure medium cylinders (47, 48, 49) downwardly converge relative to one another, said pressure medium cylinders (47, 48, 49) being individually extendible and retractable.

2. The apparatus as claimed in claim 1, wherein said three pressure medium cylinders (47, 48, 49) are spaced apart, in a horizontal plane, by equal distances.

3. The apparatus as claimed in claim 1 or 2, wherein one of said pressure medium cylinders (48) is connected at its upper end to said undercarriage (36) in a vertical plane which extends in said direction of the conveying rails (32), and wherein the two other pressure medium cylinders (47, 48) are connected to cantilever arms which horizontally project from said supporting frame.

4. The apparatus as claimed in claim 1, wherein each of said pressure medium cylinders (47, 48, 49) is tiltable, in a vertical plane, and rotatable, via a corresponding one of said second joints (58).

5. The apparatus as claimed in claim 1, wherein each of said pressure medium cylinders (47, 48, 49) is extended by pressure, and retracted by a retracting member (51).

6. Apparatus as claimed in claim 5, wherein a length of extension of the pressure medium cylinders (47, 48, 49) is determined by measuring a length of the retracting member (51).

7. The apparatus as claimed in claim 1, wherein the reel holder (37) is provided with a supporting journal (41), which is introducible into a central orifice (11) of the reel (10), such that the reel (10) can be grasped in the central orifice (11) and transported.

8. The apparatus as claimed in claim 7, wherein the supporting journal (41) and a working journal (33), which receives the reel (10) in a region of a processing machine, are formed with self-adjusting ends which fit one another with a centering cone (79), and a corresponding depression (80).

9. The apparatus as claimed in claim 8, wherein the supporting journal (41) has, at a free end thereof, an adjustable holder member for securing the reel located on the supporting journal (41), and wherein the supporting journal (41) has a greater length in an axial direction than the axial dimension of the reel (10).

10. The apparatus as claimed in claim 9, wherein the working journal (33) is pivotably mounted between a vertical position for receiving a reel, and a horizontal working position.

11. The apparatus as claimed in claim 10, wherein the working journal (33) is movable between two positions located in opposite directions, one of said positions serving as said working position, and the other position serving for stripping off a tube (63) of an empty reel (10).

12. The apparatus as claimed in claim 11, wherein the working journal (33) has an extension in the form of a pivot pin (65), which is mounted in a tilting bearing (66) between upright supporting legs (75, 76) of a machine frame (74).

13. The apparatus as claimed in claim 12, wherein the working journal (33) is driven via a driving shaft (70), which is directed transversely relative to the working journal (33), and whose drive is transmitted to the pivot pin (65) via an angular gear.

14. The apparatus as claimed in claim 10, wherein the working journal (33) has a contact disc (64) disposed about its circumference that is shiftable in the axial direction relative to the working journal (33), and that is, in a vertical position of the working journal (33), moved to a free end thereof for receiving a reel (10) supplied from above.

15. The apparatus as claimed in claim 7, wherein a camera (82), for an automatic axial alignment of the supporting journal (41) with reels (10), is disposed at a free end of the supporting journal (41), in order to position the supporting journal (41) with respect to a reel (10) and the central orifice (11).

16. The apparatus as claimed in claim 15, wherein the reels (10) are provided with colors on the tube (77) to which the camera (82) is responsive.

17. The apparatus as claimed in claim 1, wherein the reel (10) is provided with a core tube (63) which, after the reel (10) has been emptied, is stripped off a working journal and fed to a tube holder (85), which is located adjacent to the working journal and holds the tube ready for being discharged.

18. The apparatus as claimed in claim 17, wherein the tube holder (65) has a hollow body and is movable between a receiving position adjacent to the working journal and a transfer position.

19. The apparatus as claimed in claim 17 or 18, wherein the tube (63) of an empty reel (10) is removable from the tube holder (85), and is dischargeable from a supporting journal (41) of the reel conveyor (35).

* * * * *